US008924684B1

(12) United States Patent
Vincent

(10) Patent No.: US 8,924,684 B1
(45) Date of Patent: Dec. 30, 2014

(54) VIRTUAL MEMORY MANAGEMENT TO REDUCE ADDRESS CACHE FLUSHING DURING I/O OPERATIONS

(75) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 13/495,752

(22) Filed: Jun. 13, 2012

(51) Int. Cl.
*G06F 12/00* (2006.01)

(52) U.S. Cl.
USPC ............ 711/205; 711/203; 711/206; 711/207

(58) Field of Classification Search
USPC .......... 711/6, 206, 207, 203, E12.061; 718/1; 710/3, 1
See application file for complete search history.

(56) References Cited

U.S. PATENT DOCUMENTS

| 6,633,967 | B1 * | 10/2003 | Duncan | ......................... 711/207 |
| 6,832,295 | B1 * | 12/2004 | Stonecypher | ................. 711/135 |
| 7,788,464 | B2 * | 8/2010 | Sheu et al. | ..................... 711/207 |
| 2006/0236070 | A1 * | 10/2006 | Wang et al. | ................... 711/203 |
| 2008/0155168 | A1 * | 6/2008 | Sheu et al. | ........................ 711/6 |
| 2009/0113425 | A1 * | 4/2009 | Ports et al. | ......................... 718/1 |

* cited by examiner

*Primary Examiner* — Mardochee Chery

(74) *Attorney, Agent, or Firm* — Novak Druce Connolly Bove + Quigg LLP

(57) ABSTRACT

Approaches are described for reducing the number of memory address cache (e.g. TLB) flushes that need to be performed during the course of performing virtualized I/O. A device driver residing in a host domain registers a CPU that will be used for I/O processing and requests the hypervisor to pre-allocate a number of slots in the page tables to map memory pages during I/O operations. Upon receiving an I/O operation, when memory needs to be mapped, the driver provides the hypervisor with information about the registered CPU. The hypervisor uses the pre-allocated page table slots to create the new mapping and flushes the TLB cache corresponding to the CPU that will perform the I/O. The TLB cache belonging to other CPUs may not need to be flushed. The host driver ensures that the mapped memory page is used exclusively on the CPU or performs additional TLB flushes.

21 Claims, 7 Drawing Sheets

VIRTUAL MEMORY MANAGEMENT TO REDUCE ADDRESS CACHE FLUSHING DURING I/O OPERATIONS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances that are associated with (e.g. owned by) a particular user. In many cases, the underlying technology used to enable virtualization utilizes memory sharing mechanisms or other tools to communicate information between these isolated instances or virtual machines. For example, input/output (I/O) virtualization provides a way to abstract the guest operating systems and other upper layer protocols from the physical connections with the hardware. However, while virtualized I/O is useful in shared and secured environments, it often tends to suffer from performance problems, such as low throughput, high latency and high latency jitter.

BRIEF DESCRIPTION OF THE DRAWINGS

Various embodiments in accordance with the present disclosure will be described with reference to the drawings, in which.

DETAILED DESCRIPTION

Figure 1:
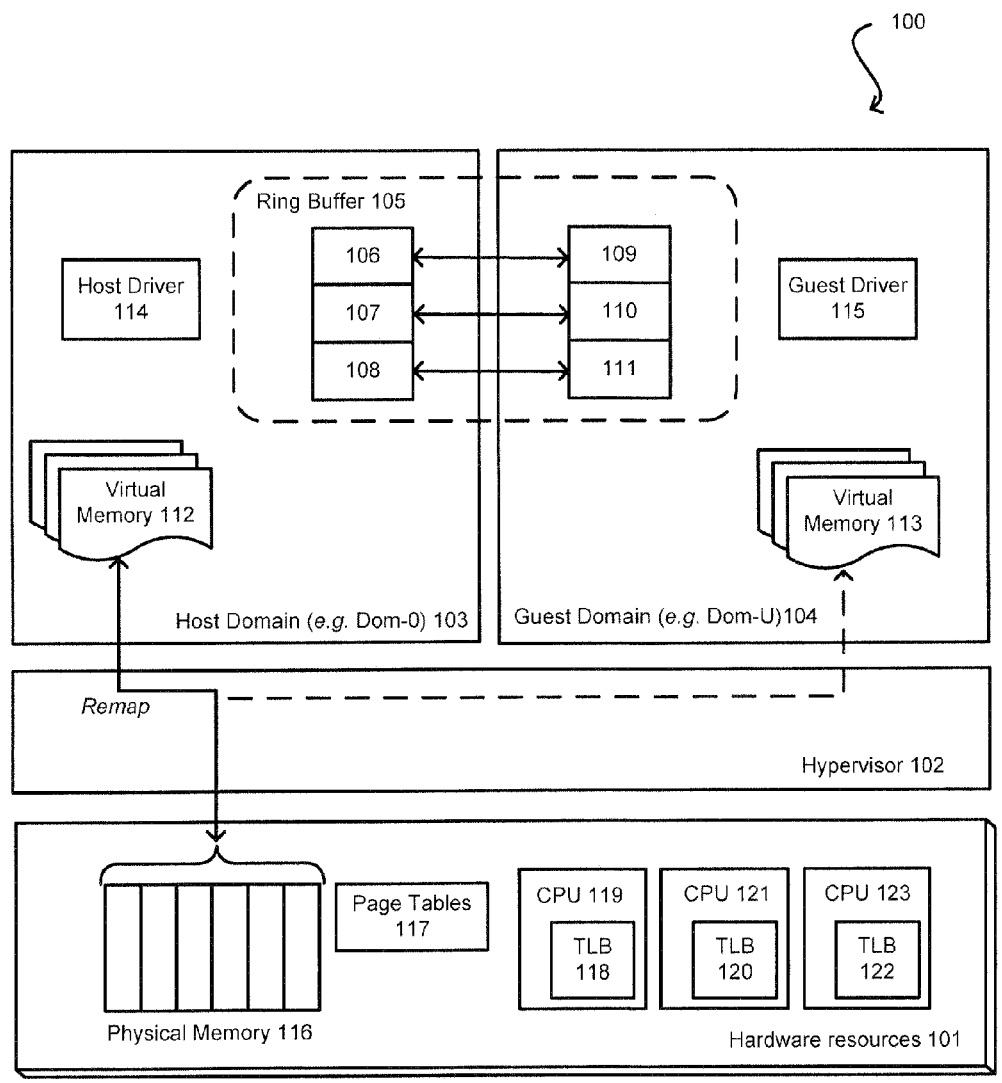
FIG. 1 illustrates an example of a virtualized computing environment in which input and output operations are performed, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for performing operations in a virtualized computing environment. In particular, various embodiments provide approaches for allocating memory locations (e.g. virtual memory buffers) for use by a particular CPU in order to perform virtualized input/output (I/O) operations. Various embodiments can then restrict the use of the allocated memory in order to reduce or limit the number of global memory address cache flushes (e.g. translation lookaside buffer (TLB) flushes) across all of the CPUs in the system when mapping or unmapping the memory for the virtualized I/O operations.

Conventionally, in virtualized environments, when a memory page is mapped into the host domain, the mapping change is made visible to all of the central processing units (CPUs) in the system. As a result, whenever the page table entries are changed, the translation lookaside buffer (TLB) on all host domain CPUs usually needs to be flushed. This operation is expensive in terms of latency and plays a big role in adding overhead to paravirtualized I/O.

In accordance with various embodiments, an approach is described that may limit or reduce the number of TLB flushes that need to be performed in the course of virtualized I/O operations. In various embodiments, such an approach can be utilized in a virtualized computing system that includes a hypervisor, a host domain and one or more guest domains that share underlying hardware resources (e.g. CPUs).

In accordance with an embodiment, a device driver that is residing in the host domain registers one central processing unit (CPU), or several CPUs, that will be used for I/O processing and requests the hypervisor to pre-allocate a number of slots in the page table structures to map memory pages during I/O operations. In alternative embodiments, the host domain device driver can register for a set of slots for each device.

In various embodiments, upon receiving an I/O operation, when a memory buffer for a particular virtualized device needs to be mapped, the device driver uses a special memory map mechanism that provides the hypervisor with the information about the device or the CPU that the mapping will be used for. In one embodiment, the hypervisor selects one of the pre-allocated page table slots to create the new mapping and flushes the TLB cache corresponding to the page table entry for the CPU that corresponds to the device in question. However, in at least one embodiment, the hypervisor does not flush the TLB cache belonging to other CPUs in the system. Accordingly, the other CPUs may have invalid. TLB flushes at certain times. In accordance with an embodiment, to account for this, the device driver in the domain ensures that the mapped memory page is used exclusively on the CPU that the memory page was registered for. In some embodiments, if the I/O stack in host domain needs to pass the I/O operation to a different CPU, then more TLB flushes are performed or memory buffers are copied to new local memory buffers.

FIG. 1 illustrates an example of a virtualized computing environment 100 in which input and output operations are performed, in accordance with various embodiments.

In accordance with the illustrated embodiment, the virtualized environment 100 includes a set of hardware 101, a hypervisor 102, a host domain 103 and one or more guest domains 104. The hypervisor 102 manages the execution of the one or more guest operating systems and allows multiple instances of different operating systems to share the underlying hardware resources 101. Conventionally, hypervisors are installed on server hardware, with the function of running guest operating systems, where the guest operating systems themselves act as servers. In various embodiments, there can be at least two types of hypervisor 102: a type 1 (bare metal) hypervisor; and a type 2 (hosted) hypervisor. A type 1 hypervisor runs directly on the hardware resources 101 and manages and controls one or more guest operating systems, which run on top of the hypervisor. A type 2 hypervisor is executed within the operating system and hosts the one or more guest operating conceptually at a third level above the hardware resources 101.

In accordance with an embodiment, the hypervisor 102 can host a number of domains (e.g. virtual machines), such as the host domain 103 and one or more guest domains 104. In one embodiment, the host domain 103 (e.g. Dom-0) is the first domain created and manages all of the other domains running on the hypervisor 102. For example, the host domain 103 can manage the creating, destroying, migrating, saving, or restoring the one or more guest domains 104 (e.g. Dom-U). In accordance with various embodiments, the hypervisor 102 controls access to the hardware resources such as the CPU, input/output (I/O) memory and hypervisor memory.

In accordance with the illustrated embodiment, the guest domain 103 includes one or more virtualized or paravirtualized drivers 115 and the host domain includes one or more physical device drivers 114. When the guest domain wants to invoke an I/O operation, the virtualized driver 115 may perform the operation by way of communicating with the physical device driver 114. When the guest driver 115 wants to initiate an I/O operation (e.g. sending out a network packet), a guest kernel component will identify which physical memory buffer contains the packet (or other data) and the guest driver 115 will either copy the memory buffer to a temporary storage location in the kernel for performing I/O or obtain a set of pointers to the memory pages that contain the packet(s). In one embodiment, the guest driver 115 will place the pointers into a data structure that is part of the ring buffer 105.

In various embodiments, the ring buffer is a set of statically mapped memory pages that are shared between the guest domain 104 and the host domain 103. These virtual pages can be linked to the same physical addresses, and they can be used as the primary channel to pass metadata and pointers associated with network packets or I/O operations. The ring buffer 105 serves as the core of front-to-back communication of a paravirtualized driver, such as driver 115. Conceptually, the ring buffer 105 can be thought of as containing a number of slots (106, 107, 108, 109, 110, 111), wherein each slot is a data structure that corresponds to an I/O operation. Each I/O operation may be associated with data from multiple memory pages. Accordingly, each data structure in the ring buffer contains a set of pointers to the memory pages for the I/O operation, as well as any metadata associated with the I/O operation.

In accordance with an embodiment, when the guest driver 115 submits an I/O operation, one of the data structures is filled out and placed into the ring buffer 105 and the host driver 114 is then notified that the I/O operation has been submitted. At this point, either the guest driver 115 or the host driver 114 (or both) may need to initiate one or more hypervisor calls to set up the grant table mechanism so that the host driver can obtain access to the data in the memory pages 113 associated with the I/O operation that has been submitted. For example, the guest domain may indicate to the hypervisor which physical memory pages 116 contain the data for the I/O operation and requests the hypervisor to grant the host domain access to those memory pages 116. The host domain then retrieves the pointers to the memory pages from the ring buffer 105 and request access to those memory pages 116 from the hypervisor. The access can be provided by either copying the data from the shared buffer into the host domain specific buffer or by performing a virtual to physical remapping of the memory buffers, where the host domain gives one or more virtual addresses 112 from its own virtual space and requests the hypervisor to perform the remapping of the physical memory pages 116 to the virtual addresses 112 of the host domain. The hypervisor 102 then performs the remapping of the physical memory 116 from the virtual address space of the guest domain into the virtual address space 112 of the host domain. Once this remapping is performed, the host domain can have access to the memory pages 116 that contain the data for the I/O operation. The host domain driver can then perform the I/O operation and once the operation is complete, the memory pages can be unmapped.

In accordance with an embodiment, one reason for low performance of virtualized I/O stack is that guest memory buffers which are part of an I/O operation may need to be mapped into host domain's memory during the I/O operation and then unmapped, as previously described. The mapping and unmapping operation can be fairly expensive as it involves multiple hypercalls, hypervisor memory management activities, host domain memory management activities and/or Translation Lookaside Buffer (TLB) flush activities. On the other hand, fully mapping the guest memory into the host domain is usually not a feasible solution. If the guest memory were to be fully mapped into host domain, then hypervisor security and isolation paradigms would be compromised since it may be much easier for the host domain to corrupt guest memory inadvertently or maliciously.

In accordance with various embodiments, a TLB is a cache containing memory addresses, which memory management hardware uses to improve the speed of translation of memory addresses. The TLB contains the mappings of various physical memory locations (e.g. addresses) to virtual memory locations. In accordance with an embodiment, each CPU (119, 121, 123) in the system is associated with its own TLB (118, 120, 122). In various embodiments, when the system needs to determine the physical address of a virtual memory location, it first inspects the TLB. If there is a TLB hit (e.g. the address is present in the TLB), the system can retrieve the physical address quickly and access the appropriate memory. If the requested address is not found in the TLB, the system will proceed to look up the address in the page tables data structure 117 by performing a page walk. Once the memory address is determined from the page tables, the virtual-to-physical address mapping can be entered into the TLB for future access.

In conventional virtual environments, when the hypervisor 102 performs the remapping of the physical memory 116 from the virtual address space 113 of the guest domain 104 into the virtual address space 112 of the host domain 104, the mapping change is often made visible to all of the CPUs (119, 121, 123) in the system. As a result, whenever the page table entries are changed in this manner, the TLBs on all host domain CPUs are usually flushed in order to prevent any CPU from having invalid memory address mappings. This operation can be quite expensive and introduce latency and lower throughput for virtualized operations.

Figure 2:
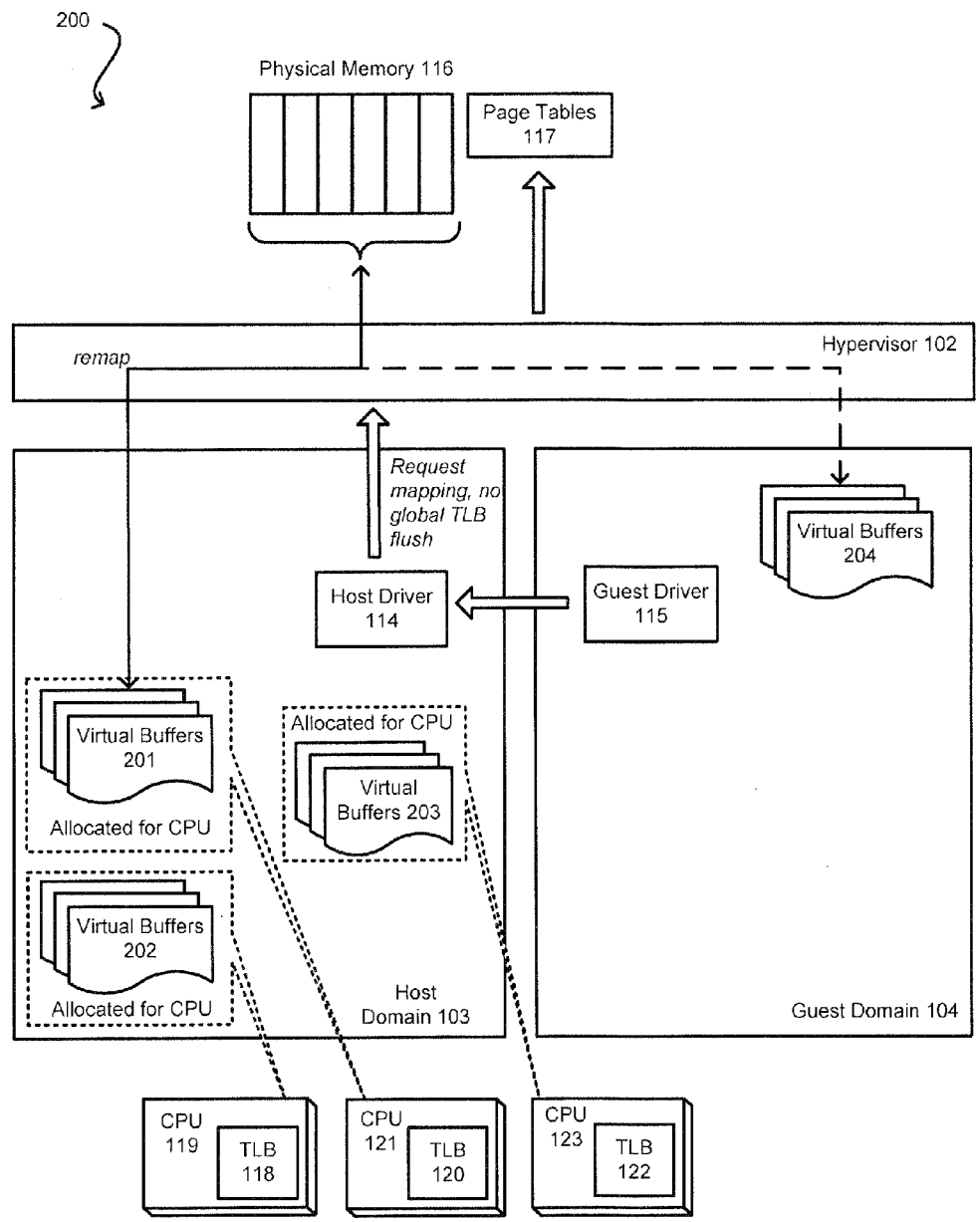
FIG. 2 illustrates an example of a virtualized environment where virtual memory is allocated for specific CPUs in order to reduce the number of necessary TLB flushes, in accordance with various embodiments.

FIG. 2 illustrates an example of a virtualized environment 200 where virtual memory is allocated for specific CPUs in order to reduce the number of necessary TLB flushes, in accordance with various embodiments. It should be understood that reference numbers for like components may be carried over between figures for purposes of explanation, but this should not be interpreted as limiting the scope of the various embodiments.

In accordance with an illustrated embodiment, one of the ways to reduce or avoid performing numerous TLB flushes is to allocate specific virtual areas which are designated for use by each CPU. For example, as shown in the figure, CPU 119 may be associated with virtual addresses 202, CPU 121 may be associated with the virtual addresses 201 and CPU 123 may be associated with virtual addresses 203. These memory areas are reserved for use by its specific CPU and in some embodiments, the system restricts other CPUs from accessing the virtual memory areas during I/O operations.

In accordance with an embodiment, when a CPU (e.g. CPU 121) makes a change to the page tables 117 by remapping one virtual memory location (e.g. 204) to another (e.g. 201), the CPU 121 can flush its own TLB 120, however the CPU does not necessarily need to flush the TLBs (118, 122) of all other CPUs (119, 123) in the system. Consequently, if other CPUs were to try to access the memory location reserved for CPU 121, they may have an invalid TLB and as a result, the other CPUs may get the wrong data. In order to account for this, the system may need to implement a scheme to ensure that only the designated CPU is allowed to access the virtual memory locations that have been allocated to it. In some embodiments, the system may violate this scheme and allow other CPUs to access the reserved memory; however, it may require the other CPUs to first perform a TLB flush in order to prevent any invalid TLB being utilized.

In accordance with an embodiment, when the guest driver 115 provides an I/O operation to the host device driver 114, the system can make sure that only the CPU that is associated with the reserved memory space processes the I/O operation without involving other CPUs in that I/O. This can be performed in several ways. In one embodiment, when the backend driver 114 receives the pointers to the physical memory 116 that contains the data for the I/O (e.g. via a ring buffer), the host driver first selects a CPU to perform the I/O operation. Once the CPU (e.g. CPU 121) has been selected, the host driver 114 can pick a virtual buffer 201 that has been allocated for that particular CPU 121 and request the hypervisor 102 to map the physical memory 116 to the virtual buffer 201 that is associated with that CPU. At the time of invoking the hypervisor to perform the remapping, the CPU 121 can also instruct the hypervisor not to flush the TLBs (118, 122) of the other CPUs (119, 123) in the system. The hypervisor then maps the memory, flushes the TLB 120 of CPU 121 and then returns a call back.

In accordance with an embodiment, once the device driver 114 obtains the mappings to the physical memory, it can be the driver's responsibility to impose restrictions to ensure that only CPU 121 accesses the memory in virtual buffer 201 during the execution of the I/O operation. In some embodiments, the device driver 114 can decide to violate these restrictions and allow other CPUs to access the virtual buffer 201, however, it must first invoke a TLB flush on the CPUs that will be accessing the virtual buffer 201 designated for CPU 121. One way to implement this restriction is for the device driver 114 to copy the data into the address space belonging to the host domain 103 and then perform I/O processing within the address space of the host domain. Another way to implement the restriction is to have functionality in the host domain stack that is CPU aware and ensures that the virtual buffer will not be accessed by other CPUs other than CPU 121.

Figure 3:
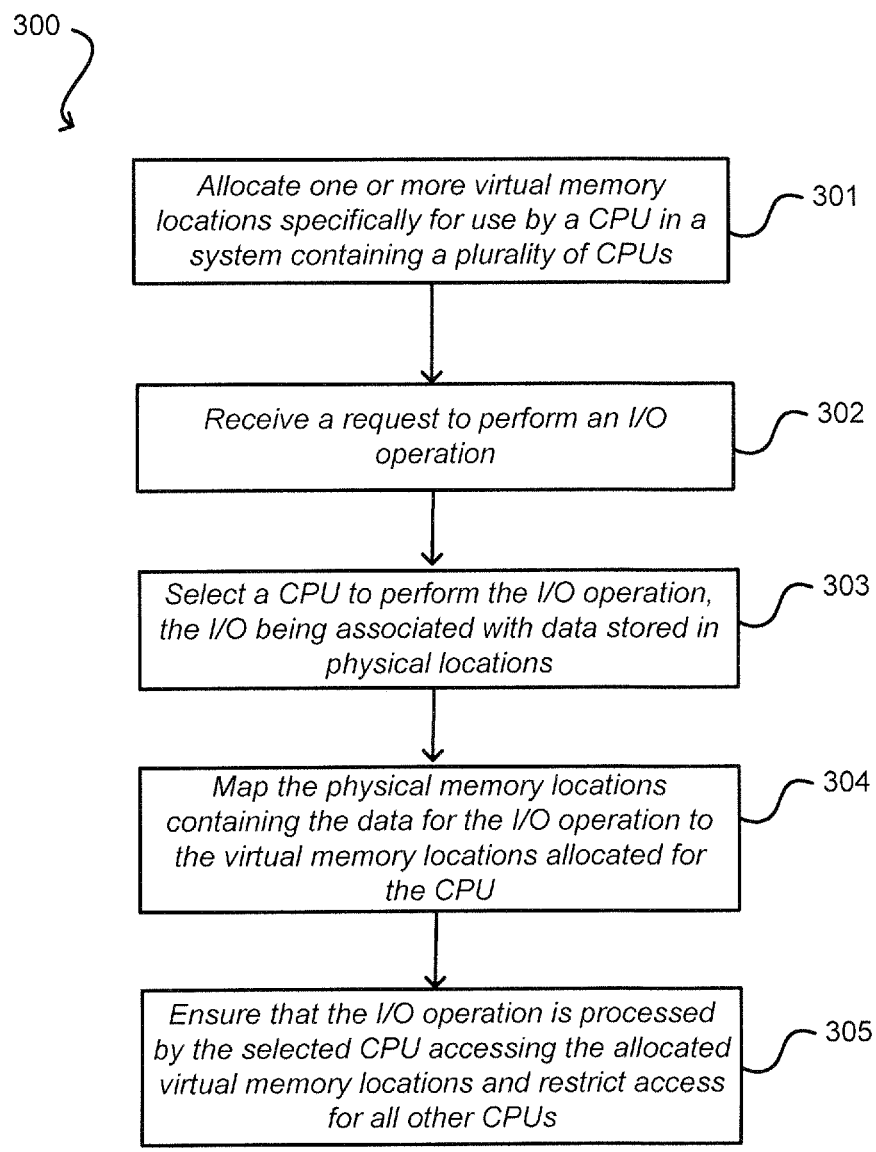
FIG. 3 illustrates an example process for allocating memory for use by specific CPUs, in accordance with various embodiments.

FIG. 3 illustrates an example process 300 for allocating memory for use by specific CPUs, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the system allocates one or more specific virtual memory locations specifically for use by one of the CPUs in the system. In accordance with an embodiment, the system can include a plurality of CPUs, and each CPU in the system may be allocated its own virtual address space.

In operation 302, the system may receive a request to perform a virtualized I/O operation. For example, the system may receive a request to send an internet protocol (IP) packet over the network using an Ethernet port (e.g. eth0). The I/O operation may involve one or more drivers, such as a paravirtualized device driver in a guest operating system communicating with a device driver in the host domain.

In operation 303, the system selects a CPU to perform the I/O operation. In accordance with an embodiment, the I/O is associated with some data that is stored in a particular physical memory location. For example, the I/O may request to write a network packet that is stored in a physical memory buffer that is mapped to a virtual memory buffer.

In operation 304, the system maps the physical memory location containing the data for the I/O operation to the virtual memory locations allocated for the CPU that was selected to perform the I/O. For example, the physical memory buffer containing the network packet may be remapped from one virtual location to another virtual location that has been specifically designated for the CPU.

In operation 305, the system ensures that the I/O operation is processed by the selected CPU using the virtual memory location that has been designated to it and restricts all other CPUs from accessing that memory location. This restriction of access may prevent the need to flush any memory address caches (e.g. TLB) that may be associated with the other CPUs. In other embodiments, the system may allow other CPUs to access the reserved memory locations by first requiring them to flush their memory address caches prior to accessing the data.

Figure 4:
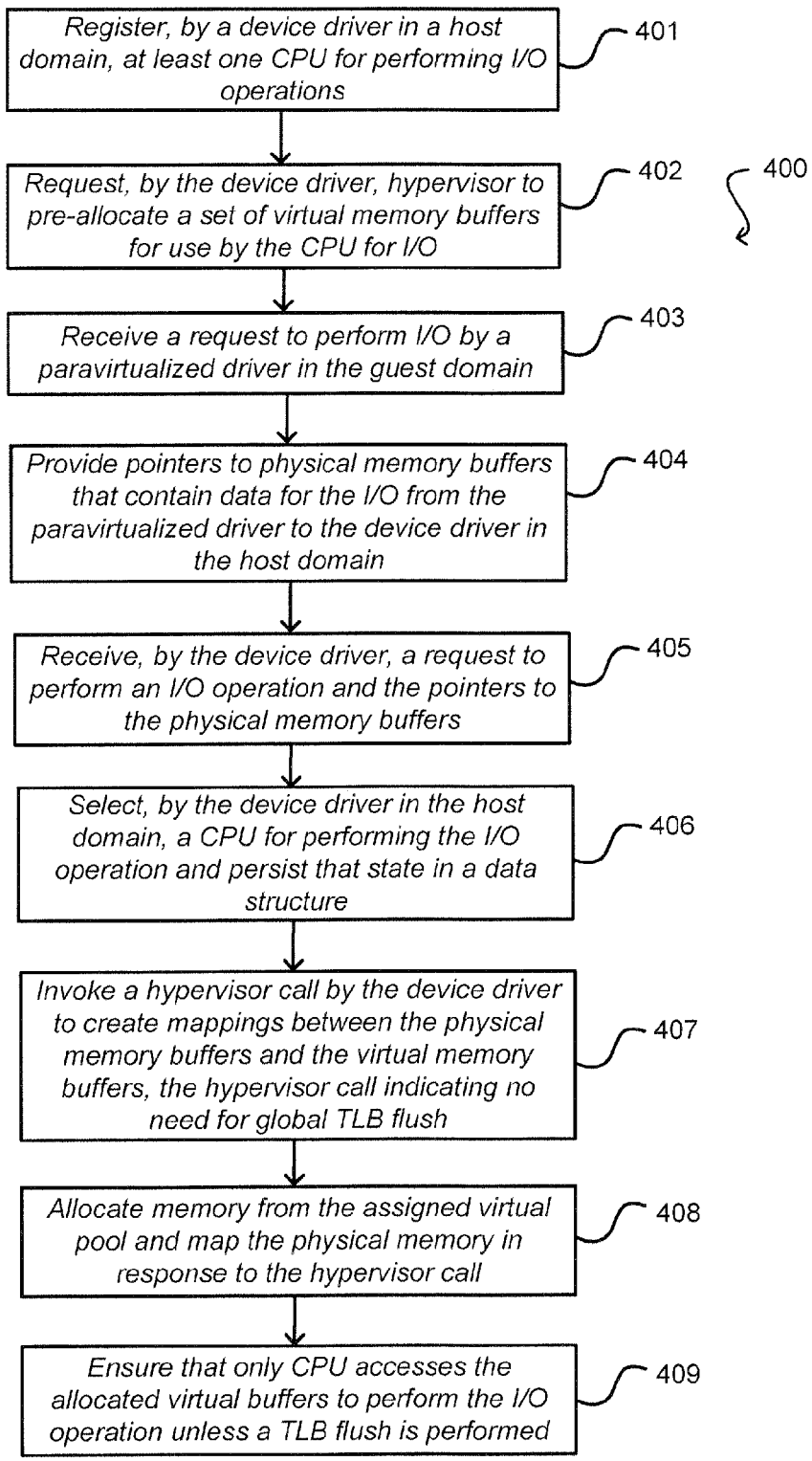
FIG. 4 illustrates an example process of allocating virtual memory addresses to a specific CPU and ensuring that only the designated CPU preforms the I/O operation in order to limit the number of TLB flushes on other CPUs, in accordance with various embodiments.

FIG. 4 illustrates an example process 400 of allocating virtual memory addresses to a specific CPU and ensuring that only the designated CPU preforms the I/O operation in order to limit the number of TLB flushes on other CPUs, in accordance with various embodiments.

In operation 401, the device driver in the host domain registers a CPU (or multiple CPUs) that will be used for I/O processing. In operation 402, the device driver requests the hypervisor to pre-allocate a set of virtual memory buffers for use by the CPU that has been registered to perform the I/O processing. For example, the device driver may request the hypervisor to allocate a number of slots in the page table structures to map memory pages during I/O operations. In alternative embodiments, the host domain device driver may register for a set of slots for each device.

In operation 403, a paravirtualized driver residing in the guest domain may receive a request to perform an I/O operation. For example, the paravirtualized driver may receive a request from an application running on the guest OS, instructing the paravirtualized driver to transmit a network packet. The guest driver can then carry out the I/O transaction by communicating with the backend device driver residing in the host domain.

In operation 404, the paravirtualized driver provides to the backend host driver one or more pointers to physical memory locations that store the data for the I/O operation. For example, the guest driver may fill out a slot in the shared ring buffer, placing the pointers to the memory locations and any metadata necessary for the I/O operation into the slot. Because the ring buffer is shared memory between the guest driver and the host driver, the host driver can then obtain access to the memory pointers, as shown in operation 405.

In operation 406, the host driver selects a CPU for performing the I/O operation that was requested of the device driver. This data can also be persisted in a designated location (e.g. a per-I/O data structure). This CPU can then be used to perform the I/O operation.

In operation 407, the host driver makes a hypervisor call, requesting the hypervisor to create a set of mappings between the physical memory addresses that contain the data for the I/O and the virtual memory addresses that have been designated for the CPU. In at least one embodiment, the call to the hypervisor further indicates that there is no need to perform a global flush of all TLBs in the CPUs. In accordance with an embodiment, the hypervisor can create the requested physical-to-virtual memory mappings in the page tables data structure and flush the TLB associated with the CPU that is to perform the I/O operation. In one embodiment, the TLBs for all other CPUs are not flushed.

In operation 408, the hypervisor, in response to the hypercall, determines which virtual pool that it needs to allocate the memory from based on the CPU information. The hypervisor then also creates the mappings between the physical memory and the virtual memory addresses so that the host driver can gain access to the data for the I/O operation.

In operation 409, the host device driver ensures that only the CPU that has been selected actually performs the I/O operation and accesses the virtual memory allocated to it. In some embodiments, other CPUs may also be allowed the virtual memory; however, in that case the hypervisor may require that the TLB of those CPUs first be flushed before allowing access to the data. Other CPUs could also be included opportunistically. For example, if another CPU were to flush its TLB due to other reasons, then the CPU can automatically be made eligible to handle I/Os whose mappings happened before the TLB flush. In another embodiment, same set of virtual addresses could be used on different CPUs wherein different physical addresses could be mapped to the same virtual address range at a given time. In this case, CPU affinity for I/O might have to be preserved strictly.

Figure 5:
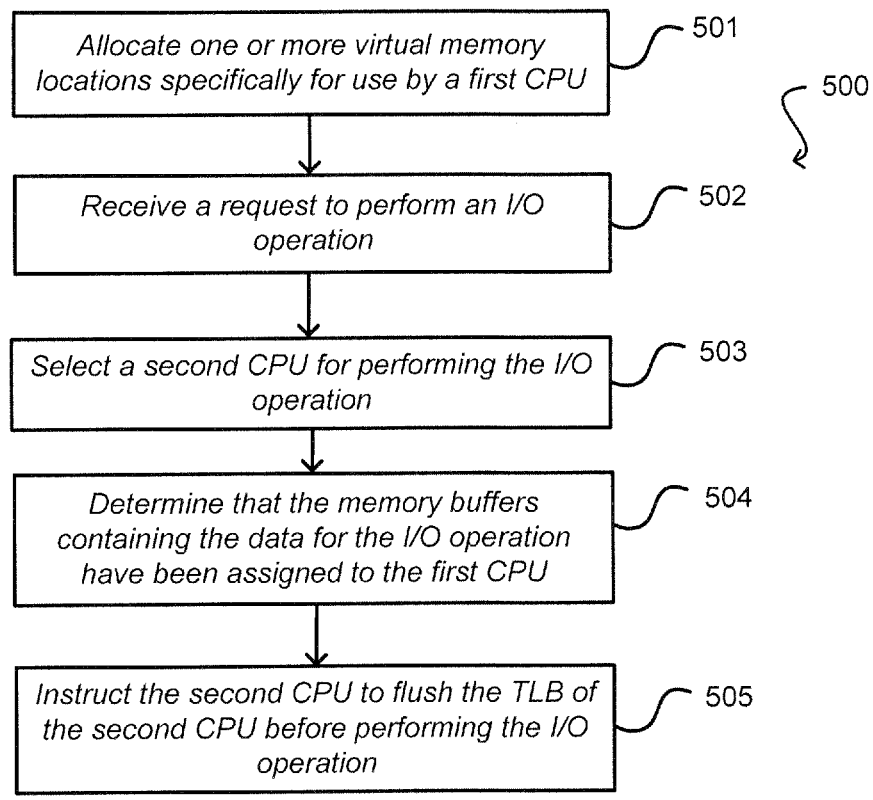
FIG. 5 illustrates an example process of allocating virtual memory for a CPU but allowing other CPUs to access the memory allocated, in accordance with various embodiments.

FIG. 5 illustrates an example process 500 of allocating virtual memory for a CPU but allowing other CPUs to access the memory allocated, in accordance with various embodiments.

In operation 501, the system allocates a set of virtual memory buffers for a first CPU, as previously described. In operation 502, the system receives a request to perform an I/O operation. This request may be received by the virtual driver in the guest domain and routed to the backend driver in the host domain. In operation 503, the system selects a second CPU to perform the I/O operation. In operation 504, the system determines that the memory buffers containing the data for the I/O have been assigned to the first CPU. In this case, the system instructs the second CPU to first flush the TLB before performing the I/O, as illustrated in operation 505. In this manner, the system is able to allow other CPUs to perform the I/O operations using the virtual memory buffers that have been allocated to the CPU in a consistent manner, by ensuring that the TLB will always be updated to the current state of the memory.

Figure 6:
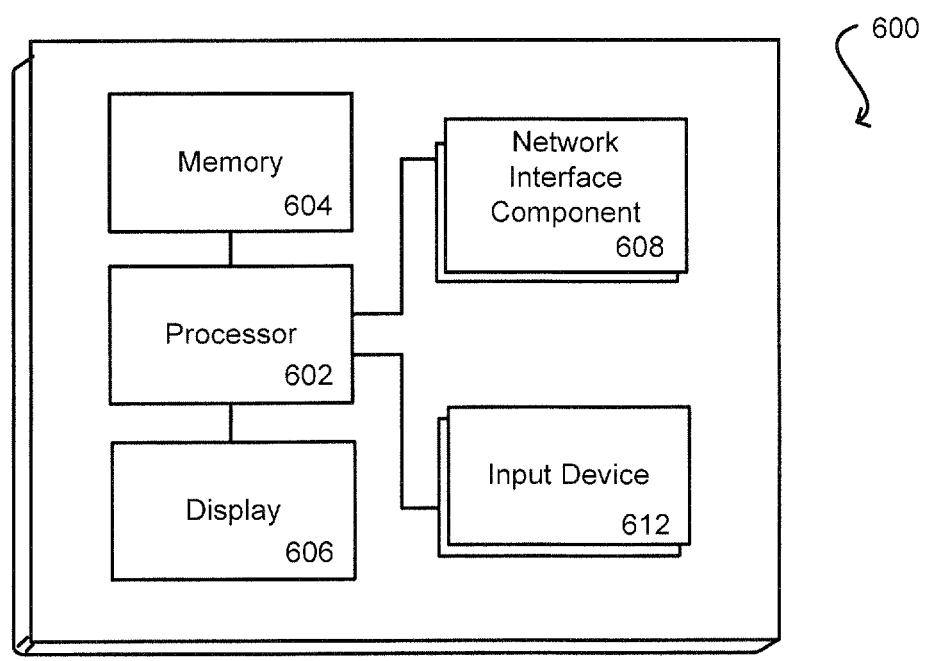
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
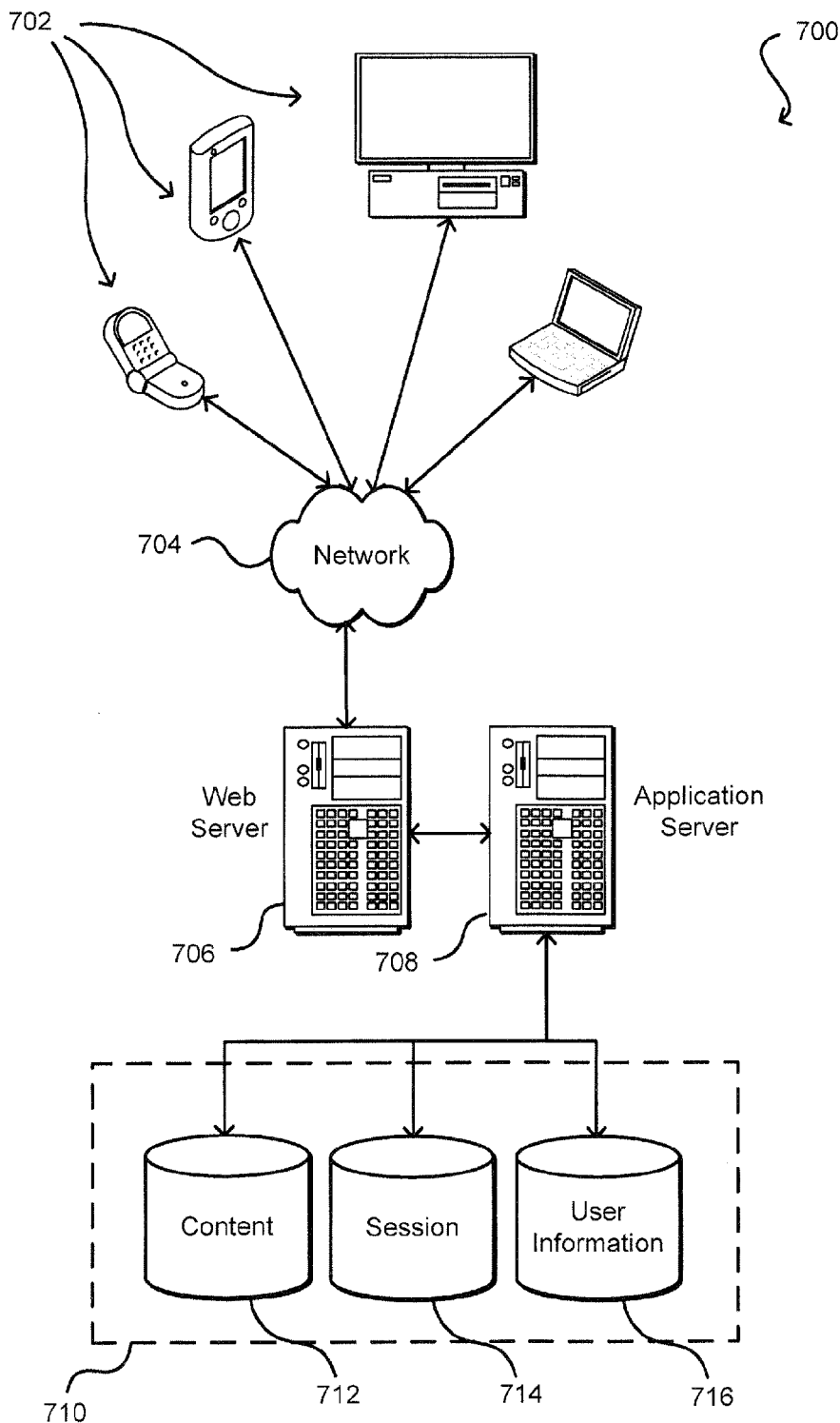
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for reducing translation lookaside buffer (TLB) flushes in a virtualized computing environment, said method comprising:
    under the control of one or more computer systems configured with executable instructions,
    allocating one or more virtual memory buffers designated for a central processing unit (CPU) of a plurality of CPUs, each CPU being associated with a translation lookaside buffer (TLB), the one or more virtual memory buffers being allocated in a host domain for performing input/output (I/O) operations;
    receiving, by a driver in the host domain, a request to perform an I/O operation, the I/O operation associated with one or more physical memory buffers;
    selecting, by the driver in the host domain, the CPU for performing the I/O operation;
    requesting, by the driver in the host domain, a mapping of the one or more physical buffers to the one or more virtual buffers allocated for the selected CPU, the requesting indicating that the mapping should not cause a global flush of each TLB in the plurality of other CPUs;
    obtaining the mapping by the driver of the host domain;
    requiring that only the selected CPU accesses the one or more physical memory buffers associated with the I/O operation; and
    if a different CPU will be provided access to the one or more physical memory buffers associated with the I/O operation, requiring the different CPU first perform a flush of the TLB of the different CPU.

2. The method of claim 1, wherein allocating one or more virtual memory buffers further includes:
    submitting, from the device driver in the host domain to a hypervisor, a request to allocate one or more slots in one or more page tables to map memory pages during I/O operations.

3. The method of claim 1, wherein receiving the request to perform the I/O operation further includes:
    receiving the request to perform the I/O operation from a paravirtualized driver in a guest domain to the driver in the host domain.

4. The method of claim 1, wherein indicating that the mapping should not cause a global flush of each TLB in the plurality of other CPUs further includes:
    instructing a flush of the TLB in the selected CPU to be performed; and
    instructing the flush not to be performed in TLBs of all other CPUs of the plurality of CPUs.

5. A computer implemented method comprising:
    under the control of one or more computer systems configured with executable instructions,
    associating one or more virtual memory locations with a specific central processing unit (CPU) of a plurality of CPUs;
    receiving a request to perform an I/O operation, the I/O operation associated with data stored in one or more physical memory locations;
    selecting the CPU for performing the I/O operation;
    causing one or more memory mappings to be established between of the one or more physical memory locations and the one or more virtual memory locations associated with the selected CPU;
    requiring that only the selected CPU accesses the one or more physical memory buffers associated with the I/O operation; and
    if another CPU will be provided access to the one or more physical memory buffers, causing an address cache of the another CPU to be flushed before providing access to the one or more physical memory buffers.

6. The method of claim 5, wherein causing the one or more memory mappings to be established further includes:
    instructing the hypervisor to flush an address cache of the selected CPU and instructing the hypervisor not to flush the address caches of other CPUs in the plurality of CPUs.

7. The method of claim 5, wherein causing the one or more memory mappings to be established further includes:

sending a request from a device driver in a host domain to a hypervisor, the request instructing the hypervisor to create the mappings in one or more page table structures.

8. The method of claim 5, wherein associating the one or more memory locations with a CPU further includes:
submitting, from a device driver in a host domain to a hypervisor, a request to allocate one or more slots in one or more page tables to map memory pages during I/O operations.

9. The method of claim 5, wherein receiving a request to perform an I/O operation further includes:
receiving, by a device driver in a host domain, a set of pointers to the one or more physical memory pages from a paravirtualized driver in a guest domain, the pointers received via a ring buffer established between the device driver and the paravirtualized driver.

10. The method of claim 5, wherein associating one or more virtual memory locations with the CPU further includes:
associating the one or more virtual memory locations with two or more CPUs that will perform I/O operations on behalf of a device driver in a host domain.

11. A computing device, comprising:
at least one processor; and
memory including instructions that, when executed by the processor, cause the computing device to:
allocate one or more virtual memory locations to at least one device;
receive, by a driver of the device, a request to perform an I/O operation, the I/O operation associated with data stored in one or more physical memory locations;
select a central processing unit (CPU) associated with the at least one device for performing the I/O operation;
cause a mapping to be established between of the one or more physical memory locations and the one or more virtual memory locations associated with the at least one device;
require that only the selected CPU accesses the one or more physical memory buffers associated with the I/O operation; and
if another CPU will be provided access to the one or more physical memory buffers, cause a memory address cache of the another CPU to be flushed before providing access to the one or more physical memory buffers.

12. The computing device of claim 11, wherein causing the mapping to be established further includes:
instructing the hypervisor to flush a memory address cache of the selected CPU and instructing the hypervisor not to flush the memory address caches of other CPUs in the plurality of CPUs.

13. The computing device of claim 11, wherein causing the mapping to be established further includes:
sending a request from a device driver in a host domain to a hypervisor, the request instructing the hypervisor to create the mappings in one or more page table structures.

14. The computing device of claim 11, wherein allocating the one or more memory locations to the at least one device further includes:
submitting, from a device driver in a host domain to a hypervisor, a request to allocate one or more slots in one or more page tables to map memory pages during I/O operations.

15. The computing device of claim 11, wherein receiving a request to perform an I/O operation further includes:

receiving, by a device driver in a host domain, a set of pointers to the one or more physical memory pages from a paravirtualized driver in a guest domain, the pointers received via a ring buffer established between the device driver and the paravirtualized driver.

16. A non-transitory computer readable storage medium storing one or more sequences of instructions executable by one or more processors to perform a set of operations comprising:
requesting to allocate one or more virtual memory locations with a specific central processing unit (CPU) of a plurality of CPUs;
receiving a request to perform an I/O operation, the I/O operation associated with data stored in one or more physical memory locations;
selecting the CPU for performing the I/O operation;
causing one or more mappings to be established between of the one or more physical memory locations and the one or more virtual memory locations associated with the selected CPU;
requiring that only the selected CPU accesses the one or more physical memory buffers associated with the I/O operation; and
if another CPU will be provided access to the one or more physical memory buffers, causing an address cache of the another CPU to be flushed before providing access to the one or more physical memory buffers.

17. The non-transitory computer readable storage medium of claim 16, wherein causing the one or more mappings to be established further includes:
instructing the hypervisor to flush an address cache of the selected CPU and instructing the hypervisor not to flush the address caches of other CPUs in the plurality of CPUs.

18. The non-transitory computer readable storage medium of claim 16, wherein causing the one or more mappings to be established further includes:
sending a request from a device driver in a host domain to a hypervisor, the request instructing the hypervisor to create the mappings in one or more page table structures.

19. The non-transitory computer readable storage medium of claim 16, wherein associating the one or more memory locations with a CPU further includes:
submitting, from a device driver in a host domain to a hypervisor, a request to allocate one or more slots in one or more page tables to map memory pages during I/O operations.

20. The non-transitory computer readable storage medium of claim 16, wherein receiving a request to perform an I/O operation further includes:
receiving, by a device driver in a host domain, a set of pointers to the one or more physical memory pages from a paravirtualized driver in a guest domain, the pointers received via a ring buffer established between the device driver and the paravirtualized driver.

21. The non-transitory computer readable storage medium of claim 16, wherein associating one or more virtual memory locations with the CPU further includes:
associating the one or more virtual memory locations with two or more CPUs that will perform I/O operations on behalf of a device driver in a host domain.

* * * * *